United States Patent
Lotya et al.

(10) Patent No.: US 11,514,288 B2
(45) Date of Patent: Nov. 29, 2022

(54) CONTACTLESS METAL CARD CONSTRUCTIONS

(71) Applicant: AMATECH GROUP LIMITED, Spiddal (IE)

(72) Inventors: Mustafa Lotya, Cellbridge (IE); David Finn, Tourmakeady (IE); Darren Molloy, Galway (IE)

(73) Assignee: AmaTech Group Limited, Galway (IE)

( * ) Notice: Subject to any disclaimer, the term of this patent is extended or adjusted under 35 U.S.C. 154(b) by 0 days.

(21) Appl. No.: 16/944,184

(22) Filed: Jul. 31, 2020

(65) Prior Publication Data

US 2020/0387768 A1 Dec. 10, 2020

Related U.S. Application Data

(63) Continuation-in-part of application No. 15/939,281, filed on Mar. 29, 2018, now Pat. No. 10,733,494, and a continuation-in-part of application No. 15/358,138, filed on Nov. 22, 2016, now Pat. No. 9,960,476, and a continuation-in-part of application No. 15/331,821, filed on Oct. 22, 2016, now abandoned, said application No. 15/358,138 is a continuation-in-part of application No. 15/072,356, filed on Mar. 17, 2016, now Pat. No. 9,836,684, and a continuation-in-part of application No. 14/862,119, filed on Sep. 22, 2015, now Pat. No. 9,697,459, and a continuation-in-part of application No. 15/197,795, filed on Jun. 30, 2016, now Pat. No. 9,812,782, which is a continuation-in-part of application No. 14/551,376, filed on Nov. 24, 2014, now Pat. No. 9,390,364, said application No. 15/358,138 is a (Continued)

(51) Int. Cl.
G06K 19/06 (2006.01)
G06K 19/077 (2006.01)

(52) U.S. Cl.
CPC . G06K 19/07773 (2013.01); G06K 19/06196 (2013.01); G06K 19/07743 (2013.01)

(58) Field of Classification Search
CPC ............. G06K 19/02; G06K 19/06196; G06K 19/07743; G06K 19/07749; G06K 19/0775; G06K 19/07754; G06K 19/07769; G06K 19/07773; G06K 19/07783

See application file for complete search history.

(56) References Cited

U.S. PATENT DOCUMENTS

| 11,114,392 B2* | 9/2021 | Kato .................. G06K 19/0775 |
| 2002/0121685 A1* | 9/2002 | Higuchi ........... G06K 19/07783 |
| | | 257/679 |

(Continued)

*Primary Examiner* — Thien M Le
(74) *Attorney, Agent, or Firm* — McAndrews, Held & Malloy, Ltd.

(57) ABSTRACT

A metal smartcard (SC) having a transponder chip module (TCM) with a module antenna (MA), and a card body (CB) comprising two discontinuous metal layers (ML), each layer having a slit (S) overlapping the module antenna, the slits being oriented differently than one another. One metal layer can be a front card body (FCB, CF1), and the other layer may be a rear card body (RCB, CF2) having a magnetic stripe (MS) and a signature panel (SP). The slits in the metal layers may have non-linear shapes.

19 Claims, 6 Drawing Sheets

Related U.S. Application Data continuation-in-part of application No. 14/619,170, filed on Feb. 11, 2015, now Pat. No. 9,634,391, and a continuation-in-part of application No. 14/492,113, filed on Sep. 22, 2014, now Pat. No. 9,798,968, which is a continuation-in-part of application No. 14/465,815, filed on Aug. 21, 2014, now Pat. No. 9,475,086, application No. 16/944,184, which is a continuation-in-part of application No. 15/818,785, filed on Nov. 21, 2017, now abandoned.

(60) Provisional application No. 62/478,208, filed on Mar. 29, 2017, provisional application No. 62/258,531, filed on Nov. 22, 2015, provisional application No. 62/371,786, filed on Aug. 7, 2016, provisional application No. 62/246,685, filed on Oct. 27, 2015, provisional application No. 62/300,906, filed on Feb. 28, 2016, provisional application No. 62/289,189, filed on Jan. 30, 2016, provisional application No. 62/281,209, filed on Jan. 21, 2016, provisional application No. 62/136,644, filed on Mar. 23, 2015, provisional application No. 62/150,307, filed on Apr. 21, 2015, provisional application No. 62/163,962, filed on May 19, 2015, provisional application No. 62/175,308, filed on Jun. 14, 2015, provisional application No. 62/201,578, filed on Aug. 6, 2015, provisional application No. 62/204,466, filed on Aug. 13, 2015, provisional application No. 62/044,394, filed on Sep. 1, 2014, provisional application No. 62/061,689, filed on Oct. 8, 2014, provisional application No. 62/080,332, filed on Nov. 16, 2014, provisional application No. 62/102,103, filed on Jan. 12, 2015, provisional application No. 62/088,598, filed on Dec. 7, 2014, provisional application No. 62/039,562, filed on Aug. 20, 2014, provisional application No. 62/035,430, filed on Aug. 10, 2014.

(56) References Cited

U.S. PATENT DOCUMENTS

| | | | | |
|---|---|---|---|---|
| 2004/0169202 A1* | 9/2004 | Kang | ............... | H01L 27/11507 257/200 |
| 2007/0069037 A1* | 3/2007 | Kawai | ............. | G06K 19/07749 235/492 |
| 2008/0203577 A1* | 8/2008 | Fukamizu | ............... | H01L 24/05 257/773 |
| 2010/0277382 A1* | 11/2010 | Tanaka | ................. | H01Q 1/38 343/741 |
| 2011/0258894 A1* | 10/2011 | Beenken | ............... | B60R 13/10 40/208 |
| 2012/0055013 A1* | 3/2012 | Finn | ................ | H01Q 1/2225 29/600 |
| 2013/0099304 A1* | 4/2013 | Kim | ................. | H01L 29/42344 257/324 |
| 2014/0131783 A1* | 5/2014 | Lee | ................... | H01L 27/11582 257/314 |
| 2014/0138765 A1* | 5/2014 | Lee | .................. | H01L 27/11582 257/330 |
| 2015/0206047 A1* | 7/2015 | Herslow | .......... | G06K 19/07779 235/492 |
| 2017/0207120 A1* | 7/2017 | Boyanov | .......... | H01L 21/76849 |
| 2017/0308785 A1* | 10/2017 | Kim | ................ | G06K 19/07722 |

* cited by examiner

Dual Interface (DI) Smart Card, and Readers

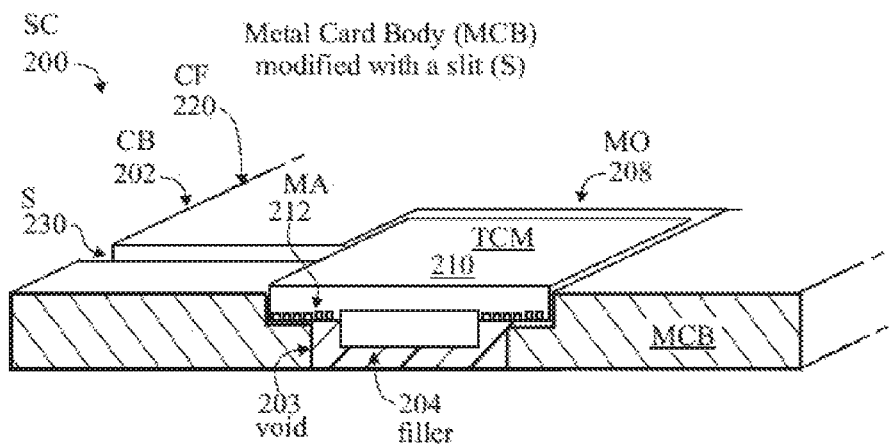
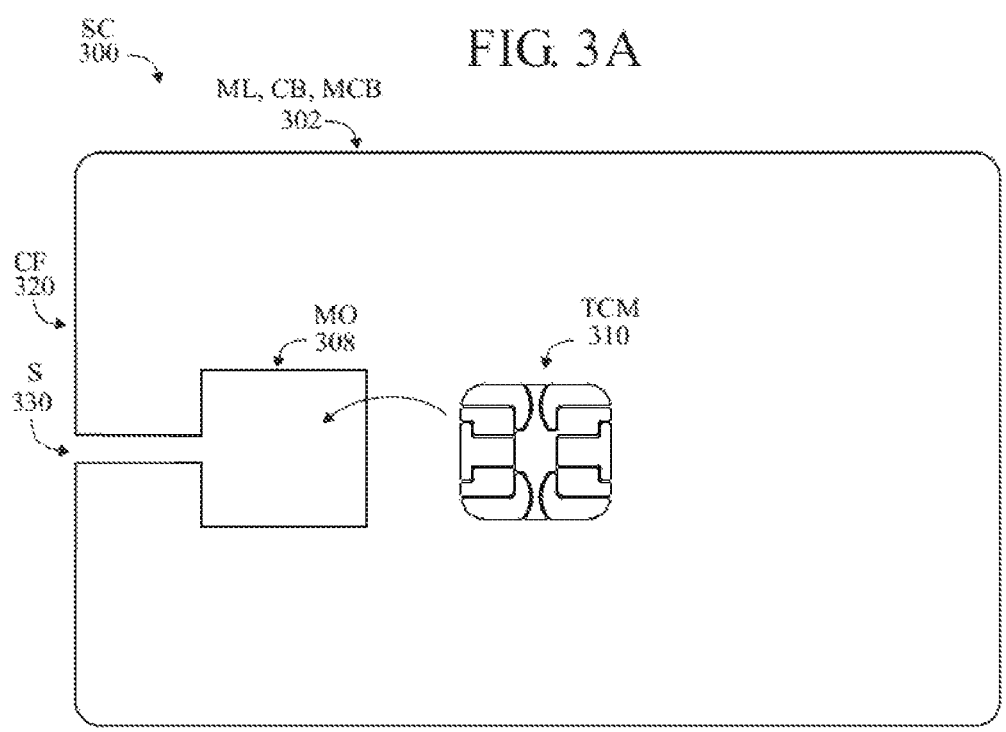

CONTACTLESS METAL CARD CONSTRUCTIONS

CROSS-REFERENCE TO RELATED APPLICATIONS

Priority (filing date benefit) is claimed from the following, incorporated by reference herein:

This is a continuation-in-part of U.S. Ser. No. 15/939,281 filed 29 Mar. 2018.

U.S. Ser. No. 15/939,281 is a non-provisional of U.S. 62/478,208 filed 29 Mar. 2017

U.S. Ser. No. 15/939,281 is a continuation-in-part of U.S. Ser. No. 15/358,138 filed 22 Nov. 2016 (US 20170077589, 16 Mar. 2017), which claims benefit/priority of/from:
   a nonprovisional of U.S. 62/258,531 filed 22 Nov. 2015
   a nonprovisional of U.S. 62/371,768 filed 7 Aug. 2016

U.S. Ser. No. 15/358,138 is a continuation-in-part of U.S. Ser. No. 15/331,821 filed 22 Oct. 2016, which claims benefit/priority of/from:
   U.S. 62/246,685 filed 27 Oct. 2015

U.S. Ser. No. 15/358,138 is a continuation-in-part of U.S. Ser. No. 15/072,356 filed 17 Mar. 2016 (U.S. Pat. No. 9,836,684, 5 Dec. 2017, which claims benefit/priority of/from:
   U.S. 62/300,906 filed 28 Feb. 2016
   U.S. 62/289,189 filed 30 Jan. 2016
   U.S. 62/281,209 filed 21 Jan. 2016

U.S. Ser. No. 15/358,138 is a continuation-in-part of U.S. Ser. No. 14/862,119 filed 22 Sep. 2015 (U.S. Pat. No. 9,697,459, 4 Jul. 2017, which claims benefit/priority of/from:
   U.S. 62/136,644 filed 23 Mar. 2015
   U.S. 62/150,307 filed 21 Apr. 2015
   U.S. 62/163,962 filed 19 May 2015
   U.S. 62/175,308 filed 14 Jun. 2015
   U.S. 62/201,578 filed 6 Aug. 2015
   U.S. 62/204,466 filed 13 Aug. 2015

U.S. Ser. No. 15/358,138 is a continuation-in part of U.S. Ser. No. 15/197,795 filed 30 Jun. 2016 (U.S. Pat. No. 9,812,782, 7 Nov. 2017, which is a continuation-in-part of U.S. Ser. No. 14/551,376 filed 24 Nov. 2014 (US 20150136858, 21 May 2015; U.S. Pat. No. 9,390,364, 12 Jul. 2016), which claims benefit/priority of/from:
   U.S. 62/044,394 filed 1 Sep. 2014
   U.S. 62/061,689 filed 8 Oct. 2014
   U.S. 62/080,332 filed 16 Nov. 2014

U.S. Ser. No. 15/358,138 is a continuation-in-part of U.S. Ser. No. 14/619,170 filed 11 Feb. 2015 (U.S. Pat. No. 9,634,391, 25 Apr. 2017, which claims benefit/priority of/from:
   U.S. 62/102,103 filed 12 Jan. 2015
   U.S. 62/088,598 filed 7 Dec. 2014

U.S. Ser. No. 15/358,138 is a continuation-in-part of U.S. Ser. No. 14/492,113 filed 22 Sep. 2014 (U.S. Pat. No. 9,798,968, 24 Oct. 2017, which is a continuation-in-part of U.S. Ser. No. 14/465,815 filed 21 Aug. 2014 (U.S. Pat. No. 9,475,086, 25 Oct. 2016), which claims benefit/priority of/from:
   U.S. 62/039,562 filed 20 Aug. 2014
   U.S. 62/035,430 filed 10 Aug. 2014

TECHNICAL FIELD

The disclosure relates broadly to RFID devices including "smartcards", "affluent metal cards", or "payment objects" (or "payment devices") such as financial payment cards, RFID enabled SIM cards (or payment cards, electronic tickets, chip cards and the like) and wearable devices (activity tracking bands, watches, smart jewelry, rings, bangles, cuffs, bracelets, talisman charms, lockets and the like) having RFID (radio frequency identification) chips or chip modules (CM) capable of operating in a "contactless" mode (ISO 14443 or NFC/ISO 15693), including dual interface (DI) smartcards which can also operate in "contact" mode (ISO 7816-2) and, more particularly, to antenna modules (AM), transponder chip modules (TCMs), Coupling Frames (CFs), Coupling Frame Antennas (CFAs) or Transponder Chip Modules (TCMs), including transponder chip modules with integrated Coupling Frame (CF), suitable for implanting, embedding, insertion or placement in smartcards, metal housings, metal casings, laminated metal layers, tokens, tags or for mechanical and electrical connection to a loop(s) of wire or spiral of wire such as a charm bracelet in payment applications.

The techniques disclosed herein may also be applicable to RFID devices including "non-secure smartcards and tags" such as contactless cards in the form of keycards, hotel room keys in the form of a metal card, medic-alert tags, access control cards, loyalty cards, frequent traveler cards, security badges, key-fobs, wearable devices, mobile phones, tokens, small form factor tags, data carriers and the like operating in close proximity with a contactless reader.

BACKGROUND

A smartcard is an example of an RFID device that has a transponder chip module (TCM) or an antenna module (AM) disposed in a card body (CB) or inlay substrate.

When operating in a contactless mode, a passive antenna module (AM) or transponder chip module (TCM) may be powered by RF from an external RFID reader, and may also communicate by RF with the external RFID reader.

A dual-interface antenna module (AM) or transponder chip module (TCM) may also have a contact pad array (CPA), typically comprising 6 or 8 contact pads (CP, or "ISO pads") disposed on a "face-up side" or "contact side" (or surface) of the module tape (MT), for interfacing with a contact reader in a contact mode (ISO 7816). A connection bridge (CBR) may be disposed on the face-up side of the tape for effecting a connection between two components such as the module antenna and the RFID chip on the other face-down side of the module tape.

A conventional antenna module (AM) or transponder chip module (TCM) may be generally rectangular, having four sides, and measuring approximately 8.2 mm×10.8 mm for a 6-contact module and 11.8 mm×13.0 mm for an 8-contact module. As disclosed herein, a generally rectangular transponder chip module (TCM) may have a larger or smaller form factor than a conventional transponder chip module (TCM). Alternatively, the transponder chip module (TCM) may be round, elliptical, or other non-rectangular shape.

A module antenna (MA) may be disposed on the module tape (MT) for implementing a contactless interface, such as ISO 14443 and NFC/ISO 15693. Contact pads (CP) may be disposed on the module tape (MT) for implementing a contact interface, such as ISO 7816. The module antenna (MA) may be wire-wound, or etched, for example:
   The module antenna (MA) may comprise several turns of wire, such as 50 μm diameter insulated wire. Reference may be made to U.S. Pat. No. 6,378,774 (2002, Toppan), for example FIGS. 12A, B thereof.

The module antenna (MA) may be a chemically-etched planar antenna (PA) structure. Reference may be made to U.S. Pat. No. 8,100,337 (2012, SPS), for example FIG. 3 thereof.

The module antenna (MA) may comprise a laser-etched planar antenna (PA) structure (LES). Reference may be made U.S. Pat. No. 9,272,370 (2016, AmaTech).

A planar antenna (PA) structure, or simply "planar antenna (PA)", whether chemically-etched (CES) or laser-etched (LES) is a type of antenna structure (AS) and may comprise a long conductive trace or track having two ends, in the form of a planar, rectangular spiral, disposed in an outer area of a module tape (MT), surrounding the RFID chip on the face-down side of the module tape. This will result in a number of traces or tracks (actually, one long spiraling trace or track), separated by spaces (actually, one long spiraling space). The track (or trace) width may be approximately 100 µm. The planar antenna may be fabricated on other than the module tape, such as on a separate substrate, and joined to the module tape.

A module antenna (MA) connected to an RFID chip (CM), typically on a substrate or module tape (MT), may be referred to as a "transponder chip module", or simply as a "transponder", or as a "module". Reference may be made to U.S. Pat. Nos. 9,489,613, 9,475,086 and 9,390,364 for examples of transponder chip modules (and coupling frames).

SUMMARY

It is a general object of the invention to provide techniques for incorporating a transponder chip module (TCM), particularly a passive transponder chip module, in an RFID device such as (but not limited to) a smart card.

It is a further object of the invention to provide improved coupling of smartcards (as an example of RFID devices and the like, including dual-interface smartcards and metal or metallized smartcards) with a contactless reader.

As used herein, a transponder chip module (TCM) may generally comprise an RFID chip and a module antenna disposed on one (face-down) side of a module tape, and contact pads on an opposite (face-up) side of the module tape. In the main, hereinafter, discussions may be directed to passive transponder chip modules operating primarily or exclusively in a contactless mode (e.g., ISO 14443, 15693). However, the techniques disclosed herein may be applicable to dual-interface transponder chip modules capable of operating in both contactless and contact modes (e.g., ISO 7816).

According to the invention, generally, RFID devices comprising (i) a transponder chip module (TCM) having an RFID chip (IC) and a module antenna (MA), and (ii) a coupling frame (CF) having a slit (S) and opening (MO) to accept a TCM. The coupling frame may be disposed closely adjacent the transponder chip module so that the slit and opening overlaps the module antenna. The RFID device may be a payment object such as an ISO metal card body with a slit (S) to function as a coupling frame.

Coupling frames (CF) in combination with transponder chip modules (TCMs) may provide for inductive coupling with a contactless reader or point of sale terminal, or another RFID device. Coupling frames (CF) in combination with transponder chip modules (TCMs) may enhance (including enable) or boost contactless communication between the transponder chip module and a contactless terminal.

As used herein, a "coupling frame" (CF) may comprise a metal layer, metal frame, metal plate or any electrically-conductive medium or surface with an electrical discontinuity such as in the form of a slit (S) or a non-conductive stripe extending from an outer edge of the layer to an inner position thereof, the coupling frame (CF) capable of being oriented so that the slit (S) overlaps (crosses-over) the module antenna (MA) of the transponder chip module (TCM), such as on at least one side thereof. The slit (S) may be straight, and may have a width and a length. In some embodiments, the slit (S) may extend to an opening (MO) for accepting the transponder chip module. In other embodiments, there may only be a slit, and no opening for the transponder chip module (TCM). Coupling frames of this type, typically a layer of metal with an opening for receiving a transponder chip module, and a slit extending from a periphery of the layer to the opening, wherein the slit overlaps at least a portion of the module antenna, may be found in U.S. Pat. Nos. 9,812,782, 9,390,364, 9,634,391, 9,798,968, and 9,475,086.

The overlap of the slit with the module antenna may be less than 100%. In addition, the width and length of the slit can significantly affect the resonance frequency of the system and may be used as a tuning mechanism. As the width of slit changes, there is a resulting change in the overlap of the slit with the antenna.

In use, the coupling frame may be disposed in close proximity to a transponder chip module, such as atop the module, so that the slit (or other discontinuity) overlaps at least a portion of the module antenna of the transponder chip module, so that the coupling frame enhances (including enables) coupling between the transponder chip module and another RFID device such as a contactless reader. When the slit is not overlapping the antenna, communication with the transponder chip module may be suppressed (or inhibited, including disabled). The coupling frame may be incorporated into an RFID device such as a smart card, it may constitute substantially the entire body of a metal smart card, it may be incorporated into the transponder chip module, and it may comprise a component of a payment object.

In order to satisfy communication requirements for a given smartcard application, in terms of maximum communication read/write range for example, the chip (IC) must have a minimum power level delivered to it. The module antenna (MA) inductance, resistance and capacitance all affect the power level delivered to the chip (IC); at the maximum communication distance from the reader antenna, the module antenna (MA) is delivering the minimum chip (IC) power level. The better the performance of a given module antenna (MA) with a given chip (IC), the greater the maximum communication distance of the transponder chip module (TCM) with respect to the reader antenna.

This disclosure also relates to passive RFID devices operating on the principle of inductive coupling to effectuate data communication and harvest energy with and from a contactless reader and to drive active elements, in particular for integration into payment and identification objects.

In their various embodiments, the invention(s) described herein may relate to industrial and commercial industries, such RFID applications, payment smartcards, payment smartcards with dynamic displays, identity cards, loyalty cards, access control cards, payment objects, wearable devices, smart jewelry and the like.

According to the invention, generally, a metal smartcard (SC) has a transponder chip module (TCM) with a module antenna (MA), and a card body (CB) comprising two discontinuous metal layers (ML), each layer having a slit (S) overlapping the module antenna, the slits being oriented differently than one another. One metal layer can be a front card body (FCB, CF1), and the other layer may be a rear card body (RCB, CF2) having a magnetic stripe (MS) and a signature panel (SP).

The invention focuses on the arrangement of metal layers which are coupling frames, in a card body of a smartcard. Typically, the transponder chip module is added to the smartcard after the card body is already manufactured.

According to some embodiments of the invention, a metal smartcard may comprise at least two metal layers, each having a slit (S) and functioning as a coupling frame (CF). For example, the card body of the smartcard may comprise:

- a first metal layer (ML, FCB) with a first slit (S1) extending from an outer edge thereof to a first module opening (MO1) for accepting a transponder chip module (TCM), the first metal layer functioning as a first coupling frame (CF1); and
- a second metal layer (ML,RCB) with a second slit (S2) extending from an outer edge thereof to a second module opening (MO2) for accepting a transponder chip module (TCM), the second metal layer functioning as a second coupling frame (CF2);
- wherein the two coupling frames (CF1, CF2) mechanically support one another in particular around the two slits (S1, S2) and module openings (MO).

The slits (S1, S2) in the various metal layers (CF1, CF2) may each overlap a portion of a module antenna (MA) of the transponder chip module (TCM). The slits of the different metal layers may be oriented or positioned differently than one another so that they are not aligned with one another.

The first metal layer may be provided with a recess to accommodate (receive) the second metal layer. The two metal layers may be separated by a layer of non-conductive material, such as an adhesive film.

The second metal layer may form the back of the smartcard, and may contain (support) any or all of a magnetic strips (MS); a signature panel (SP); and a hologram.

One or both of the coupling frames (CF1, CF2) may be connected to a device circuit to power the circuit or improve the read/write performance of the smartcard in conjunction with a reader.

The second module opening (MO2) in the second metal layer (CF2) may be replaced by an elongated, contoured or looped slit (S2) or multiple slits (S) to improve overall mechanical stability of the smartcard.

The smartcard and transponder chip module may be passive, harvesting power from an external reader.

The module antenna in the transponder chip module may comprise a planar antenna comprising a single long conductive track laid out in a spiral pattern.

The front card body (FCB) may have a thickness of 760 μm to 800 μm.

The rear card body (RCB) may have a a thickness of 300 μm to 400 μm.

The resulting smartcard may be operable in both contact and contactless modes. Contact mode would be facilitated by contact pads on the front surface of the smartcard. However, it is generally preferred that the smartcard be intended (and used) only in a contactless mode.

It should be understood that the metal smartcard being described herein is "predominantly" metal, and may include other materials such as protective layers, signature panel, the transponder chip module itself, ink, etc.

Other objects, features and advantages of the invention(s) disclosed herein, and their various embodiments, may become apparent in light of the descriptions of some exemplary embodiments that follows.

BRIEF DESCRIPTION OF THE DRAWINGS

Reference will be made in detail to embodiments of the disclosure, non-limiting examples of which may be illustrated in the accompanying drawing figures (FIGs). Some figures may be in the form of diagrams. Some elements in the figures may be exaggerated, others may be omitted, for illustrative clarity.

Any text (legends, notes, reference numerals and the like) appearing on the drawings are incorporated by reference herein.

Some elements may be referred to with letters ("AM", "BA", "CB", "CCM", "CM", "MA", "MT", "PA", "TCM", etc.) rather than or in addition to numerals. Some similar (including substantially identical) elements in various embodiments may be similarly numbered, with a given numeral such as "310", followed by different letters such as "A", "B", "C", etc. (resulting in "310A", "310B", "310C"), and variations thereof, and may be collectively (all of them at once) or individually (one at a time) referred to simply by the numeral ("310").

The figures presented herein may show different embodiments of RFID devices, such as smart cards, solid metal cards, plastic hybrid metal cards (also know as embedded metal cards) or payment objects such as wearable devices. Some of the drawings may omit components such as the transponder chip module or module antenna, for illustrative clarity. Some of the figures may show only components of an RFID device, such as coupling frames.

Figure 1:
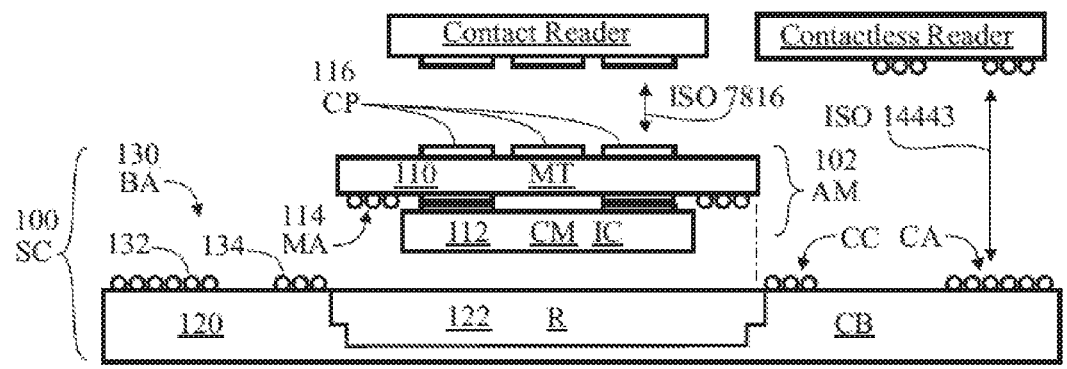

FIG. 1 is a diagram (cross-sectional view) of a dual-interface smart card (SC) and readers.

Figure 2A:
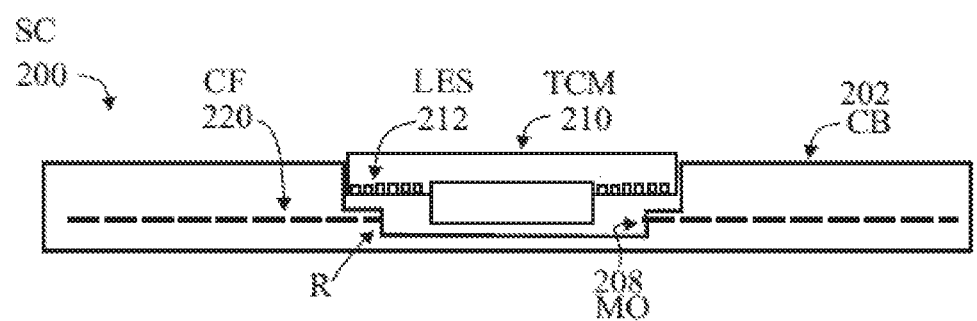

FIG. 2A is a diagram (cross-sectional view) illustrating a coupling frame in a card body of a smart card.

FIG. 2B is a diagram (partial perspective view) illustrating smart card having a metal card body modified to function as a coupling frame.

FIG. 3A is a diagrammatic view of a front surface of a smart card (SC) which may be a metal card or composite metal card having a slit (S) to function as a coupling frame (CF).

Figure 4A:
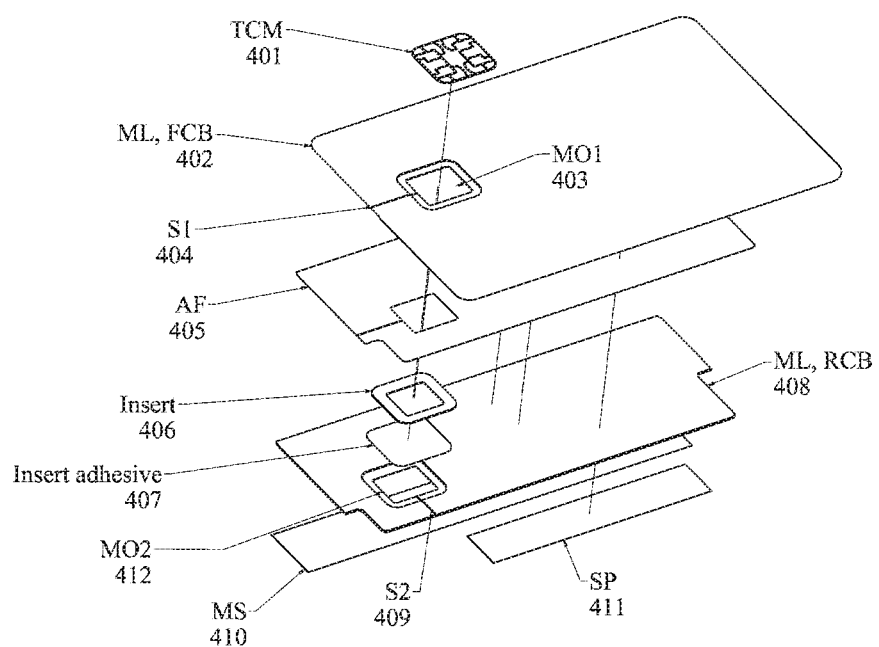

FIG. 4A is a diagram (perspective view) illustrating an assembly of a metal smart card composed primarily of two coupling frames (CF) with slits (S) featuring an insert to conceal the module openings (MO).

Figure 4B:
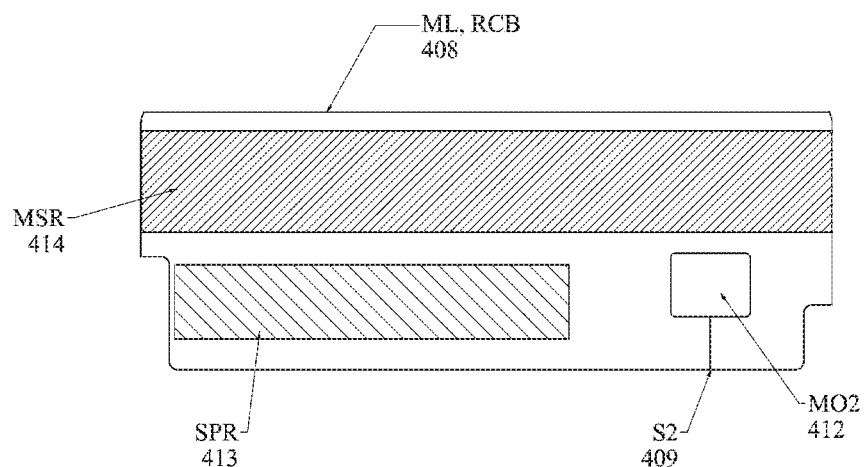

FIG. 4B is a diagram (rear view) illustrating the shape and features of the rear card body (RCB) featuring a module opening (MO), slit (S) and recesses to accommodate a magnetic stripe (MS) and signature panel (SP).

Figure 5A:
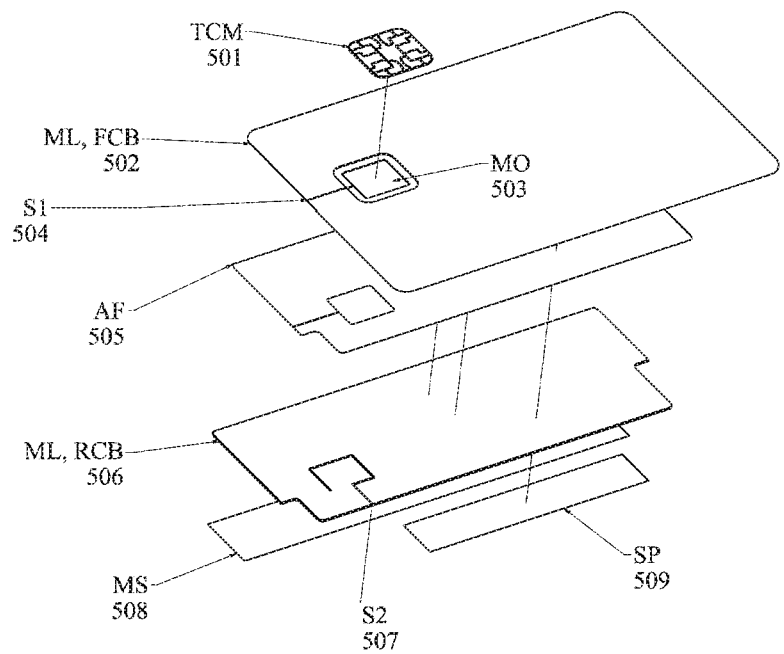

FIG. 5A is a diagram (perspective view) illustrating an assembly of a metal smart card composed primarily of two coupling frames (CF) with slits (S) which omits a module opening (MO) in the rear of the smart card.

Figure 5B:
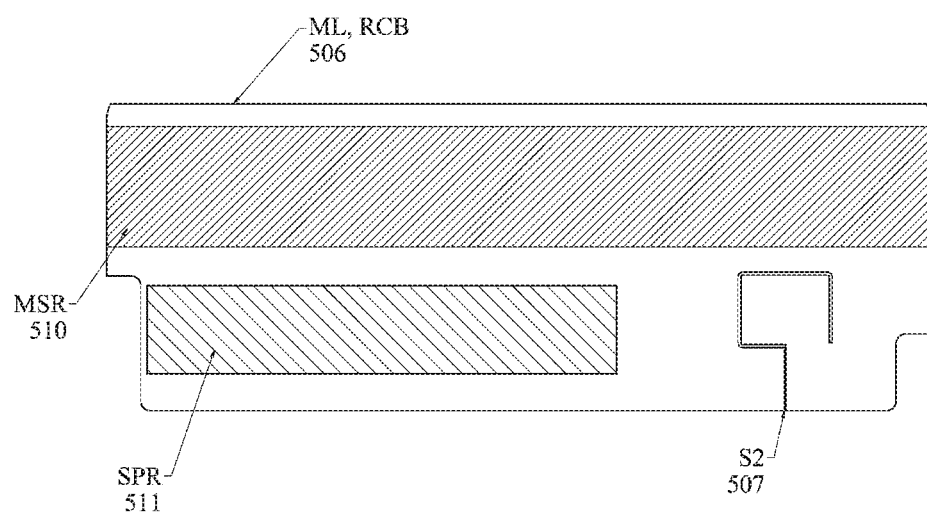

FIG. 5B is a diagram (rear view) illustrating the shape and features of the rear card body (RCB) featuring an extended slit (S) and recesses to accommodate a magnetic stripe (MS) and signature panel (SP).

Figure 6A:
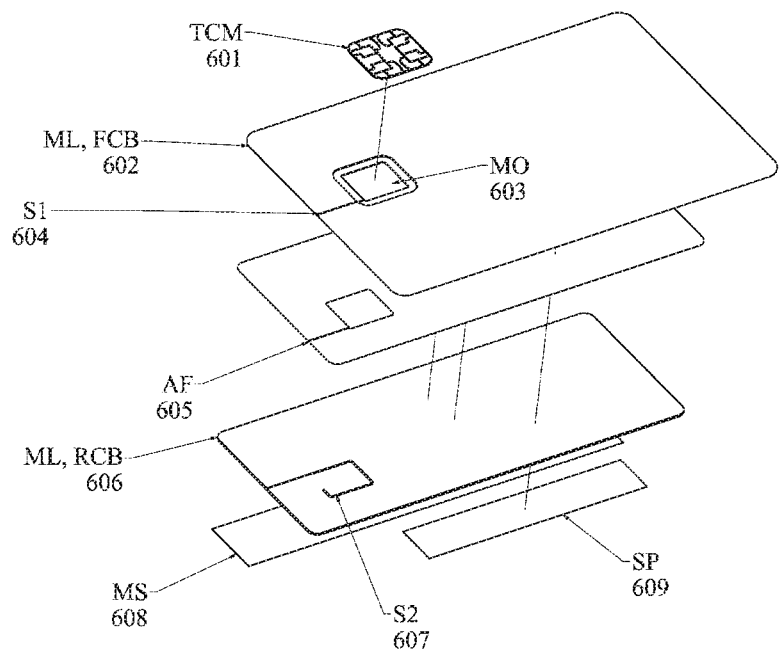

FIG. 6A is a diagram (perspective view) illustrating an assembly of a metal smart card composed primarily of two coupling frames (CF) with parallel slits (S) which omits a module opening (MO) in the rear of the smart card.

Figure 6B:
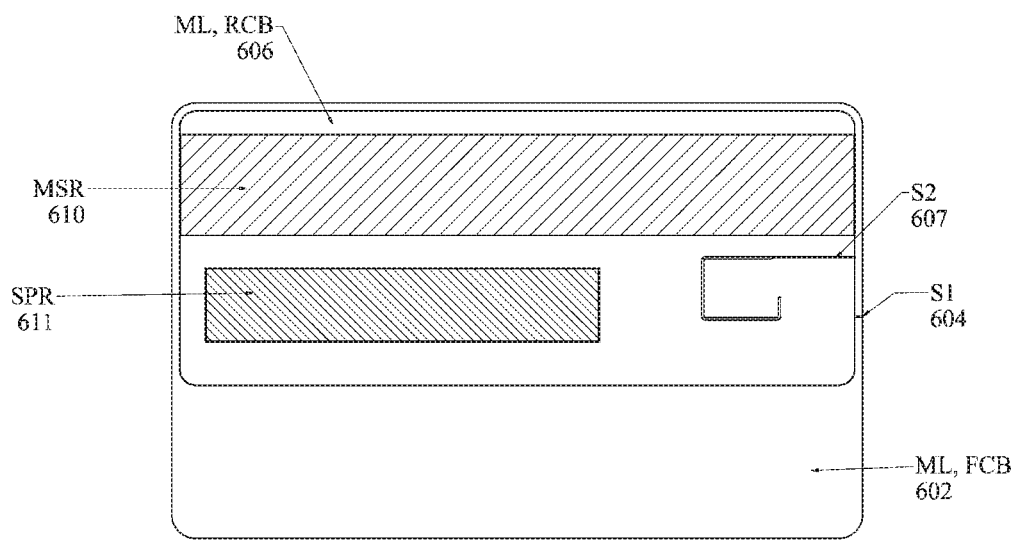

FIG. 6B is a diagram (rear view) of the rear of a metal smart card featuring a rear card body (RCB) panel containing an extended slit (S) and recesses to accommodate a magnetic stripe (MS) and signature panel (SP).

Figure 6C:
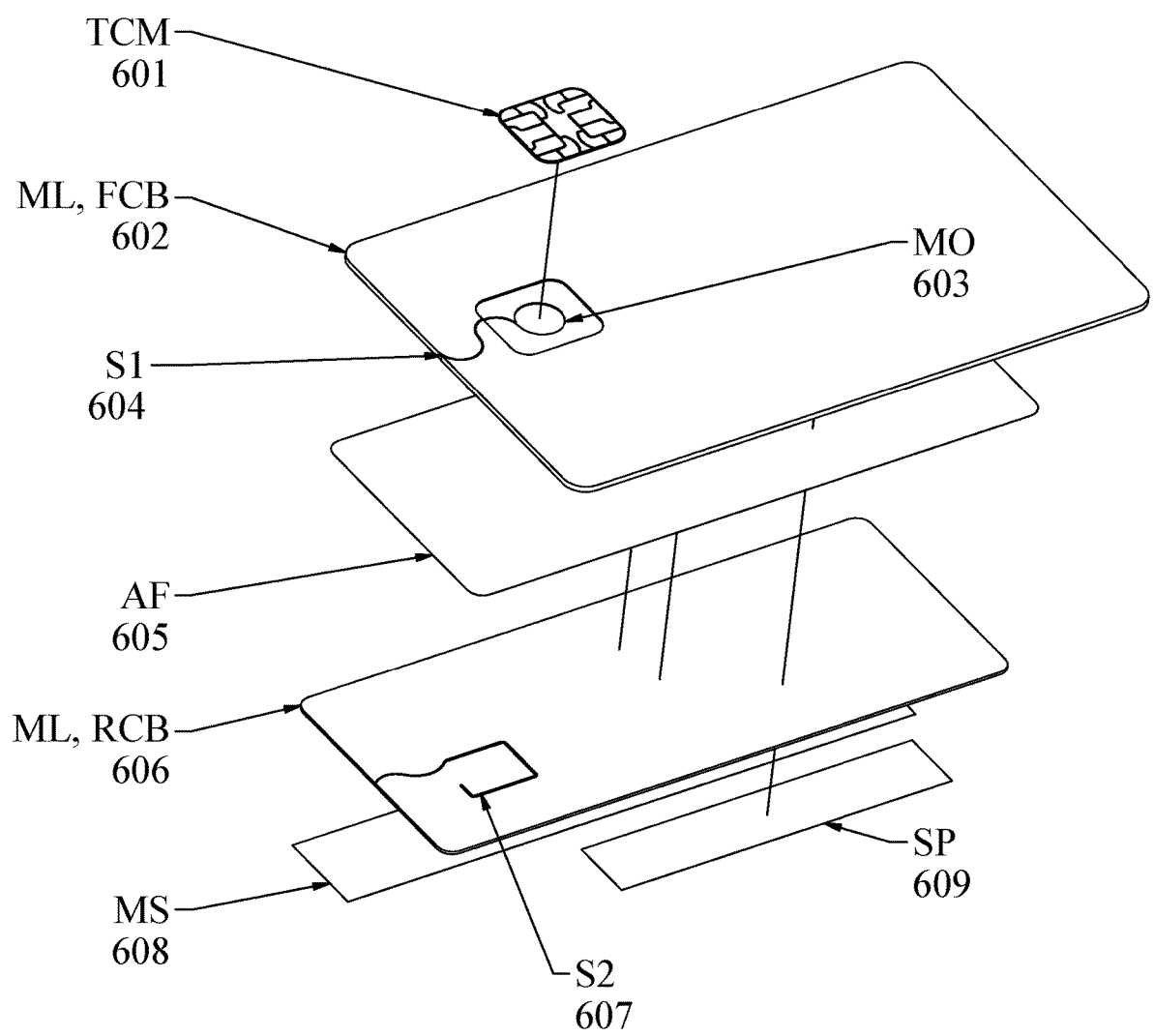

FIG. 6C is a diagram (perspective view, exploded) illustrating an assembly of a metal smart card having two metal layers (ML) functioning as coupling frames (CF), according to the invention.

DETAILED DESCRIPTION

Various embodiments (or examples) may be described to illustrate teachings of the invention(s), and should be construed as illustrative rather than limiting. It should be understood that it is not intended to limit the invention(s) to these particular embodiments. It should be understood that some individual features of various embodiments may be combined in different ways than shown, with one another. Reference herein to "one embodiment", "an embodiment", or similar formulations, may mean that a particular feature, structure, operation, or characteristic described in connection with the embodiment is included in at least one embodiment of the present invention. Some embodiments may not be explicitly designated as such ("an embodiment").

The embodiments and aspects thereof may be described and illustrated in conjunction with systems, devices and methods which are meant to be exemplary and illustrative, not limiting in scope. Specific configurations and details may be set forth in order to provide an understanding of the invention(s). However, it should be apparent to one skilled in the art that the invention(s) may be practiced without some of the specific details being presented herein. Furthermore, some well-known steps or components may be described only generally, or even omitted, for the sake of illustrative clarity. Elements referred to in the singular (e.g., "a widget") may be interpreted to include the possibility of plural instances of the element (e.g., "at least one widget"), unless explicitly otherwise stated (e.g., "one and only one widget").

In the following descriptions, some specific details may be set forth in order to provide an understanding of the invention(s) disclosed herein. It should be apparent to those skilled in the art that these invention(s) may be practiced without these specific details. Any dimensions and materials or processes set forth herein should be considered to be approximate and exemplary, unless otherwise indicated. Headings (typically underlined) may be provided as an aid to the reader, and should not be construed as limiting.

Some processes may be presented and described in a series (sequence) of steps. It should be understood that the sequence of steps is exemplary, and that the steps may be performed in a different order than presented, some steps which are described may be omitted, and some additional steps may be omitted from the sequence and may be described elsewhere.

Reference may be made to disclosures of prior patents, publications and applications. Some text and drawings from those sources may be presented herein, but may be modified, edited or commented to blend more smoothly with the disclosure of the present application. Citation or identification of any reference should not be construed as an admission that such reference is available as prior art to the disclosure.

FIG. 1 is a diagram (cross-sectional view) of a conventional dual-interface smart card (SC) and readers, as exemplary of an RFID device. This RFID device is "dual interface" since it can interact either with external contact readers (e.g., ISO 7816) or with contactless readers (e.g., ISO 14443, 15693).

The diagram illustrates a smart card SC (100) in cross-section, along with a contact reader (e.g., ISO 7816) and a contactless reader (e.g., ISO 14443). An antenna module (AM, or transponder chip module TCM) 102 may comprise a module tape (MT) 110, an RFID chip (CM or IC) 112 disposed on one side (face-down) of the module tape MT along with a module antenna (MA) 114 for interfacing with the contactless reader. The antenna module (AM) may comprise contact pads (CP) 116 disposed on the other (face-up) side of the module tape (MT) for interfacing with the contact reader. The card body (CB) 120 comprises a substrate which may have a recess (R) 122 extending into one side thereof for receiving the antenna module (AM). (The recess R may be stepped—such as wider at the surface of the card body (CB)—to accommodate the profile of the antenna module AM.) The booster antenna (BA) 130 may comprise turns (or traces) of wire (or other conductor) embedded in (or disposed on) the card body CB, and may comprise a number of components such as (i) a card antenna (CA) component 132 and (ii) a coupler coil (CC) component 134. It may be noted that, as a result of the recess R being stepped, a portion of the card body (CB) may extend under a portion of the antenna module (AM), more particularly under the module antenna (MA).

In the main, hereinafter, RFID devices having only a contactless interface (and not having a contact interface) may be described. In the main, hereinafter, RFID devices having a coupling frame rather than a booster antenna may be described.

Coupling Frames

According to some embodiments of the invention, the booster antenna in an RFID device may be eliminated, or replaced by a "coupling frame" (CF). Generally, the overall function of both a booster antenna and a coupling frame are to enhance (improve) coupling and communication between a transponder chip module (TCM) and an external contactless reader (or with another RFID device).

As used herein, a coupling frame (CF) may generally comprise a conductive, planar surface or element (such as a conductive layer, or a conductive foil) having an outer edge, and discontinuity such as a slit (S) or a non-conductive stripe extending from the outer edge of the conductive surface to an interior position thereof. The coupling frame may be a curved surface, rather than being planar.

Most of the coupling frames described herein may have a "continuous" surface, and may comprise a foil or sheet or layer of metal having a slit (an electrical discontinuity) for overlapping a module antenna and, in some cases having an appropriate opening (MO) for accommodating mounting the transponder chip module. Coupling frames may be printed, and may be made up of a wire grid or array (such as wire embedding wire (copper or silver) and making a physical connection through overlapping wires to create a coupling frame. The coupling frame could also be a metal mesh.

When referring to the overall coupling frame as being "continuous", it should be understood that the slit (S) represents a mechanical and electrical discontinuity. A "discontinuous" coupling frame could be made from a solid metal layer, or from embedding wire in a suitable pattern in a substrate, both of which would be arranged to exhibit a slit/discontinuity.

In use, a coupling frame may be disposed closely adjacent to (in close proximity, or juxtaposed with) a transponder chip module (TCM) having a module antenna (MA) so that the slit (S) overlaps (traverses, over or under) at least a portion of the module antenna. For example, the slit (S) may extend from a position external to the module antenna, crossing over (or overlapping) at least some of the traces of the module antenna, such as extending over all of the traces on one side of the module antenna and may further extend into the interior area (no-man's land) of the module antenna.

In use, the coupling frame CF may be positioned so that the slit S overlaps or traverses at least some of the traces of the module antenna MA on at least one side thereof. The slit S may extend at least partially, including completely across only one side of the module antenna, and may extend further across a central area ("no-mans land") of the module antenna (devoid of traces) to the opposite side of the module antenna. The coupling frame and the module antenna may both be substantially planar, positioned very close together, parallel with one another, and separated by an air gap or dielectric layer which may be no greater than 100 µm, 50 µm or 20 µm. Generally, the closer the coupling frame is to the module antenna (smaller separation), the better the communication (such as read/write performance) with the external contactless reader will be. With increasing separation distance, the read/write performance may degrade.

The coupling frame may enhance communication (signal, power) between an external contactless reader and the transponder chip module when the slit is positioned across (to traverse) the traces of the module antenna on at least one side thereof.

Transponder chip modules are conventionally incorporated into RFID devices which are smart cards (including plastic smartcard, metal smartcard, metal veneer smartcard, hybrid smartcard). A coupling frame can be incorporated into the smart card. Refer to U.S. Pat. No. 9,475,086. A coupling frame may be incorporated into the transponder chip module itself. Refer to U.S. Pat. No. 9,390,364. As disclosed herein, transponder chip modules may be incorporated into other RFID devices, such as payment objects comprising wearable devices, smart jewelry and payment accessories.

A coupling frame may be incorporated in metal payment devices to enable contactless communication. A coupling frame may be incorporated in any RFID device having multiple transponder chip modules to selectively enable communication with a given one of the transponder chip modules. Multiple coupling frames may be incorporated into a given RFID device. A coupling frame may substitute (eliminate the need) for a booster antenna in an RFID device.

Incorporating Coupling Frames into RFID Devices

According to the invention, generally, a transponder chip module (with or without its own coupling frame) can be incorporated into an RFID device such as a smartcard or a payment object. The device may constitute a passive transponder.

- A smartcard may comprise a metal layer which is modified (typically with a slit appropriately located vis-à-vis the module antenna) to function as a coupling frame.
  - An entire metal card body of a metal smart card may be provided with a slit (S, or other discontinuity) to function as a coupling frame.
  - An entire metal card body of a metal smart card may be provided with a slit (S, or other discontinuity) together with inserted or interlocking metal panels, each of which may be provided with a slit (S, or other discontinuity).
  - a metal layer of a hybrid smartcard (having dielectric layer and metal layer) may be provided with a slit (S, or other discontinuity) to function as a coupling frame.
- A payment object may comprise a "wearable" device embodied in a jewelry item, bangle, bracelet or the like having a metal component modified (typically with a slit appropriately located vis-à-vis the module antenna) to function as a coupling frame
- A card body can be made from aluminum and directly coloured by anodizing procedures. Jewelry items may be manufactured to have a rustic appearance that wears (or acquires a patina) during use such that the appearance of the product improves over time.

A metal layer in a metal hybrid smartcard (aka embedded metal card) may comprise a metal core having two metal layers with slits located in different (including opposite) directions, or otherwise offset from each other (including in the same direction), and said metal layers electrically insulated by a dielectric such as a screen printed adhesive film or a pre-assembled adhesive/plastic laminate. Alternatively the metal may layer may have recesses milled or etched one side over the area of the slit to accommodate a re-enforcing structure to prevent bending of the finished card around the area of the slit (S).

Metal jewelry items having transponders incorporated therein may operate as payment objects. To insert a transponder into a metal casing or a metal charm, the metal would normally operate like a faraday cage with all electromagnetic transmission, and reception would be impaired. As disclosed herein, by providing a slit or slot (or an insulating strip or stripe) in a metal component of the metal charm so that the component may function as a coupling frame. A transponder device (with or without its own coupling frame integrated therein) may be located, embedded or inserted into the metal charm and can couple with the metal charm which in turn couples with the external contactless reader generating the electromagnetic field.

By incorporating a coupling frame into the device, contactless communication between the RFID chip of the transponder chip module and an external RFID reader or another RFID device may be enhanced or enabled.

The slit (S) in a coupling frame may be linear (straight) or curved, and may have a width of approximately 20 microns, 50 microns, 100 microns, 500 microns, 1-2 mm and a length of approximately 8-13 mm, but may have other dimensions and form factors. The slit (S) may be arranged to overlap (traverse) the traces of the module antenna at 90° thereto, or at another angle. The slit (S) may be other than straight.

The slit (S) may be disguised as part of the card artwork or its presence may invisible (hidden, rendered inconspicuous) by the application of lacquers and inks. The slit (S) may be widened to enable display of artwork or form a visible decorative feature, the area of the slit may be filled with a decorative panel that may be of different material, texture or colour from other elements of the card.

It should be understood that the coupling frame may be on a different plane than the module antenna. The slit of the coupling frame may overlap or traverse at least some outer turns (or traces) of the module antenna on one side thereof, including overlapping all of the turns of the module antenna on the one side thereof and extending into (above) the inner area (no-mans land) of the module antenna. The slit may be long enough to overlap one or more turns of the module antenna on an opposite side of the module antenna. The slit may be wide enough to overlap one or more inner turns of the module antenna on one or both adjacent side(s) of the module antenna.

A transponder chip module (with or without its own coupling frame) can be incorporated into an RFID device which may be a smartcard or other payment object.

A coupling frame may be movable so as to selectively enable (enhance) or disable (suppress) communication with a transponder chip module incorporated into the RFID device. A coupling frame may be associated with two or more transponder chip modules in a single RFID device, and may be movable to selectively enable one or the other of, or neither one of the transponder chip modules.

FIG. 2A shows an example of a smart card 200 with a coupling frame (CF) 220 incorporated into its card body (CB) 202 which has a stepped recess (R). A transponder chip module (TCM) 210 has a planar antenna (PA) which may be a laser-etched antenna structure (LES) 212. The coupling frame (CF) has an opening (MO) 208 for receiving the transponder chip module (TCM). The coupling frame (CF) may have a slit (not visible) extending from the opening (MO) to an outer edge of the coupling frame (CF). The dashed line indicates, schematically, that the coupling frame may comprise a metal layer in a stackup of a card body. An inner edge of the coupling frame (CF) may overlap (or underlie) at least some outer turns of the module antenna (MA), which may be a planar antenna (PA) which is laser-etched antenna structure (LES) in the transponder chip module (TCM). Viewed from another perspective, an outer portion of the module antenna (MA may overhang an inner portion of the coupling frame (CF). The coupling frame (CF) may enhance communication between the transponder chip module and another RFID device such as a contactless reader. The transponder chip module may be dual-interface, supporting both contactless and contact communication with external readers.

FIG. 2B illustrates a transponder chip module (TCM) 210 disposed in the card body (CB) 202 of a metal smartcard (SC) 200, or metal card (MC), wherein substantially the entire card body (e.g., 760 µm thick) comprises metal, and may be referred to as a metal card body (MCB). The transponder chip module (TCM) may reside in an opening (MO) 208 extending completely through the card body, the opening may be stepped, having a larger area portion and smaller area portion, as shown. This may result in a void 203 behind the transponder chip module (TCM), and the void may be filled with non-conductive filler 204. In a conventional metal smart card (not having a slit to function as a coupling frame), the void behind the transponder chip module may allow electromagnetic radiation from an external reader to interact with the transponder chip module.

A slit (S) 230 extends from an outer edge of the metal card body (MCB) to the opening (MO) and may overlap (underneath, as viewed) an outer portion of the module antenna (MA) 212 which may be a laser-etched antenna structure (LES). Similarly, a slit may be provided through a metal layer of a hybrid smart card. The slit (S) modifies the metal card body (MCB) or layer, allowing it to operate as a coupling frame 220 to enhance contactless communication with the transponder chip module.

FIG. 2B is illustrative of a coupling frame 220 substantially surrounding a transponder chip module and having an opening to accommodate the transponder chip module.

Although a module opening for the transponder chip module may be shown in the illustrations of this and some other embodiments, it should be understood that many of the techniques described herein may be applicable to coupling frames having a slit, without a module opening. Such coupling frames may not be strictly coplanar with the transponder chip module, but they may be disposed closely adjacent and parallel thereto.

Metal payment objects such as metal smart cards may feature a cavity to accommodate the transponder chip module TCM. The cavity may not completely penetrate the payment object, or it may be covered from one face by a continuous metal. The transponder chip module may be shielded from the continuous metal layer by magnetic shielding material. This allows the cavity to be concealed. In addition the slit may be concealed by jewels or crystals.

The Opening in the Coupling Frame

It is noteworthy that, in some of the figures of prior publications discussed above, such as FIGS. 2C and 2D of U.S. Pat. No. 9,475,086 there is typically a sizeable opening (module opening MO, central opening CO) in the body of the coupling frame to accommodate the transponder chip module, and the slit S in the coupling frame extends from the opening to an outer edge of the coupling frame. This was driven by the form factor of smart cards and the desire to keep the coupling frame as close as possible to the module antenna. The coupling frame was typically substantially coplanar with the module antenna, and typically surrounded it.

As disclosed herein, a coupling frame CF may be a planar (or non-planar, 3D) conductive element having an outer periphery (edge) and having a slit S extending from its outer edge to an inner location on the conductive element. In an RFID device, the coupling frame may be disposed (arranged) to overlap the transponder chip module, and may be oriented (arranged) so that the slit S overlaps (traverses over, or under) the turns (traces) of the module antenna on one side thereof. As distinguished from the coupling frames disclosed for example in U.S. Pat. No. 9,475,086 (see also U.S. Pat. Nos. 9,489,613 and 9,390,364), in the coupling frames disclosed herein the inner end of the slit S need not terminate in a distinct opening sized to accommodate the transponder chip module TCM. Essentially, it is the slit rather than the opening that dictates the electrical characteristics of the coupling frame. Some of the coupling frames disclosed herein may be non-planar, including curved or tubular.

In many of the examples and embodiments presented herein, coupling frames and transponder chip modules may be integrated into payment objects, which may also be referred to as "payment devices", or simply "devices".

Example of a Coupling Frame

FIG. 3A illustrates the front side of a smartcard (SC) 300 which may be a metal card having a metal layer (ML), which may constitute substantially the entire thickness of the card body (CB) 302. The card body (CB) may have a module opening (MO) 308 wherein a transponder chip module (TCM) 310 may be disposed, and a slit (S) 330 extending from the module opening (MO) to the outer perimeter of the metal layer (ML) so that the metal card body (MCB) 302 may function as a coupling frame (CF) 320. The metal layer (ML) (or card body CB, or metal card body MCB) may comprise stainless steel, titanium, or any other metal or metal alloy and is provided with a slit, slot or gap in the metal to create an open loop coupling frame (CF) closely adjacent to and substantially fully surrounding the transponder chip module (TCM).

The slit (S) may overlap at least a portion of the module antenna (MA, not shown) of the transponder chip module. In some examples and embodiments of coupling frames incorporated into RFID devices disclosed herein, there may not need to be an opening (MO) in the coupling frame (CF) for the transponder chip module (TCM).

This concept of modifying a metal element to have a slit (S) to function as a coupling frame (CF) may be applied to other products which may have an antenna module (AM) or transponder chip module (TCM) integrated therewith, such as watches, wearable devices, and the like.

The slit (S) may extend completely (fully) through the metal layer (ML) forming the coupling frame (CF). The slit (S) may extend only partially through the metal layer, and remaining material of the metal layer below the slit (S) may have a thickness below a transparency threshold or skin depth for the metal layer. The slit (S) may have a width which is smaller than the opening. The slit (S) may be at least partially filled with an electrically non-conducting material selected from the group consisting of polymer and epoxy resin, reinforced epoxy resin. A reinforcing structure (RS) may be disposed at a location of the slit (S) to reinforce the metal layer (ML).

An activation distance for a transponder chip module (TCM) disposed in (or under, or above) the opening (MO) of the coupling frame may be at least 20 mm; at least 25 mm; at least 30 mm; at least 35 mm; up to 40 mm; and more than 40 mm.

A component element may be connected across the slit such as a capacitor to enhance performance. The transponder chip module may also house a capacitor to improve coupling.

Metal Smartcard Designs Using Coupling Frames

FIG. 4A illustrates an exploded view of a solid metal smartcard comprising two metal layers (ML) attached together (joined with one another) by an adhesive film (AF) 405. The front card body (FCB) 402 composed of a metal layer (ML) contains a first module opening (MO1) 403 that accepts a specially designed transponder chip module (TCM) 401. The front card body (FCB) 402 may have thickness 760 μm to 800 μm. The rear card body (RCB) 408 fits into a pocket milled, etched, stamped or otherwise formed in the rear side of the front card body (FCB) 402. The front card body (FCB) 402 comprises a first slit (S1) 404 that allows the front card body (FCB) 402 to perform as a coupling frame (CF). The module antenna on the transponder chip module (TCM) 401 may have suitable overlap with the front card body (FCB) 402 to allow optimum performance of the device when operating in contactless communication with an external reader.

An insert 406 made of plastic or other suitable non-conductive material may be disposed behind the first module opening (MO1) 403 in the front card body (FCB) 402 and may be milled or otherwise shaped to accommodate the volume occupied by the chip IC and encapsulation from the transponder chip module (TCM) 401. An insert adhesive 407 in film or liquid form may be provided to bond the insert 406 to the card. The rear card body (RCB) 408 is composed of a metal layer (ML), featuring a second module opening (MO2) 412 and a second slit (S2) 409; it behaves as a coupling frame (CF). The rear card body (RCB) 402 may have thickness 300 μm to 400 μm. The insert 406 may be composed of multiple parts and may contain a tuning circuit with antenna windings and/or capacitors to influence the resonant characteristics of the smartcard.

FIG. 4B shows the outer face of the rear card body (RCB) 408 panel. The second slit (S2) 409 is shown in this example as commencing from an internal edge of the panel with respect to the overall perimeter of the assembled card. It is noted that a small gap is provided between the internal edges of the rear card body (RCB) 408 and the front card body (FCB) 402 in order to prevent electrical short circuiting of the second slit (S2) 409, this gap may be of the order of 10 μm to 50 μm. The rear card body (RCB) 408 also features two recesses that may be formed by any appropriate technique including laser ablation, chemical etching or milling. One recess may be used to accommodate a magnetic stripe, i.e. the magnetic stripe recess (MSR) 414. A second recess for a signature panel, i.e. signature panel recess (SPR) 413, may also be provided. These recesses may enable these features to sit flush with the card surface. The recesses may be, alternatively, simply textured regions to assist alignment and adhesion of the appropriate features.

Either one or both of the front card body (FCB) 402 and the rear card body (408) may be coated in a dielectric material. For example, the coating may be a hard wearing decorative black diamond-like-carbon (DLC) with characteristics of very high electrical resistivity. This may be achieved by control of the ratio of conductive carbon (e.g. graphitic $sp^2$ hybridised and amorphous carbon) to insulating carbon (e.g. diamond type $sp^3$ hybridised carbon). Alternative coatings may be considered and may be transparent or other colour, this also includes the use of paints and lacquers or layers of coatings to achieve a desired finish. The coating(s) may be applied to any or all of the surfaces or edges of either of the front card body (FCB) 402 or rear card body (RCB) 408 in order to provide the necessary electrical isolation between the two panels and enable each to perform as a coupling frame (CF). The use of a dielectric or high resistivity coating in this manner enables the slit (S2) 409 to commence from an internal part of the overall card structure and extend towards the second module opening (MO2) 412. This is significant as this configuration can allow strengthening of the assembled card by offsetting the positions of the two slits (S1, 404; S2, 409), in this particular example allowing them to run perpendicular to one another, thereby stabilising the card in the region of the module openings (MO1, 403; MO2, 412).

Either one or both of the front card body (FCB) 402 and the rear card body (RCB) 408 may be electrically connected, across their respective slits (S1, S2) or other locations to a device or circuit assembly in order to power a circuit or to improve the read/write performance of the smartcard with respect to a reader antenna. The additional circuit or device may be housed in a layer independent of the FCB and RCB and may, for example, reside between them, interacting with the induced eddy currents in each of the coupling frames (CF1, CF2).

The slits (S1, 404; S2, 409) may be made discrete and less visible by cutting them to a narrow width (e.g. 10 μm, 20 μm, 50 μm to 150 μm), this may be achieved by laser cutting for example. In addition the apparent width of the slits (S1, 404; S2, 409) may be reduced by the thickness of coating applied to front or rear card bodies (FCB 402, RCB 408). For example for a diamond-like-carbon (DLC) coating each edge of the slits (S1, 404; S2, 409) may have a coating thickness of 5 microns thereby reducing the apparent slit width by 10 microns. Alternative coating types or use of multiple coating layers may have allow a greater reduction in apparent slit width.

Attention is directed to U.S. Ser. No. 15/818,785 filed 21 Nov. 2017, particularly FIG. 16A thereof, which describes a smartcard having multiple metal layers with slits, the slits in the various layers being oriented differently than one another.

FIG. 5A illustrates an exploded view of a similar construction to that shown in FIG. 4A and FIG. 4B with similar layout of transponder chip module (TCM) 501, front card body (FCB) 502, first slit (S1) 504, module opening (MO) 503 and adhesive film (AF) 505. The design does not necessarily feature an insert at the module position. The rear card body (RCB) 506 may comprise a second slit (S2) 507 and accommodates the magnetic stripe (MS) 508 and signature panel (SP) 509.

FIG. 5B shows the outer face of the rear card body (RCB) 506. The panel shown features a magnetic strip recess (MSR) 510 and a signature panel recess (SPR) 511. The rear card body does (RCB) 506 not feature a module opening (MO) as described previously. Instead, the design features an extended slit (S2) 507 which runs inwards from an edge of the rear card body (RCB) 506 panel that is internal to the metal smart card and describes a loop around an area overlapping the module antenna (MA) of the transponder chip module (TCM) 501.

The second slit (S2) 507 is formed, such as as-shown, to leaves an area of solid metal behind the transponder chip module (TCM) 501 instead of a module opening (MO). The second slit (S2) 507 in this manner may enable the rear card body (RCB) 506 to function as a coupling frame (CF) by directing induced eddy currents around the module antenna (MA) and permitting inductive coupling. In addition, the design of the second slit (S2) 507 in this manner eliminates the need for an insert or other fill material to cover a module opening (MO) and prevents the occurrence of a potential weak spot in the card body behind the transponder chip module (TCM) 501.

The slit (S2) 507 may describe any shape, including spiral, in order to optimise the overlap of the coupling frame with a given module antenna (MA). The slit (S2) 507 may have varying width along its length, e.g. it may begin at the edge of the panel at a width of 100 μm and widen when in proximity to the module antenna (MA) to 300 μm in order to increase the radio frequency communication performance of the device. The slits (S1, 504; S2, 507) may be filled with resin or other material to prevent ingress of liquid or debris during use of the card. The slit (S2) 507 may also be concealed by placement of a security hologram, logo or other feature. A recess may be cut, etched or otherwise formed over some or all of the area defined slit (S2) 507 in order to allow the concealing element to be subsequently sited flush with the rear card body (RCB) 506.

FIG. 6A shows an exploded view of a variation of a solid metal dual interface card. In this case the first slit (S1) 604 of the front card body (FCB) 602 runs parallel to the second slit (S2) 607 of the rear card body (RCB) 606 but is off-set in position such that the slits do not overlap, thereby increasing the mechanical stability of the card near the position of the transponder chip module (TCM) 601. The configuration shown may apply equally to a rear card body (RCB) 606 panel that includes a module opening (MO) and second slit (S2).

FIG. 6B shows a rear view of the assembled solid metal dual interface card, excluding the magnetic stripe (MS) 608 and signature panel (SP) 609. The offsetting of the positions of the slits (S1) 604 and (S2) 607 is shown, such that the slits do not overlap. The rear card body (RCB) 606 fits into a pocket milled, etched, stamped or otherwise formed in the rear side of the front card body (FCB) 602. The pocket may allow the rear card body (RCB) 606 to be wrapped around its perimeter by a frame from the front card body (FCB) 602. This frame may serve a role in stabilising the front card body (FCB) 602 during production of the pocket. For example, if the pocket is formed by a milling tool stress on the metal layer (ML) comprising the front card body (FCB) 602 may cause permanent warping. The presence of the frame as shown in FIG. 6B may add rigidity and stability to the front card body (FCB) 602 and to the overall card assembly.

FIG. 6C shows an exploded view of a variation of a solid metal dual interface card. The illustrated assembly of a metal smart card has two metal layers (ML; FCB 602 and RCB 606), each metal layer functioning as coupling frames (CF), each metal layer having a slit (S1, S2), and the slits both have non-linear shapes. The front metal layer 602 has a slit (S1) and a module opening 603. The rear metal layer 606 has a slit (S2), and no module opening. The front metal layer 602 may be substantially the full (ID-1) size of the card, while the rear metal layer 606 may be smaller than the front metal layer.

FIG. 6C is similar to FIG. 6A. Some features shown in FIG. 6C, which differ from those shown in FIG. 6A, may include:

The module opening (MO) 603 in the front card body (FCB) 602 has a larger rectangular upper portion for accepting the module tape (and contact pads, and module antenna) of transponder chip module (TCM) 601, and a smaller round (such as circular) lower portion for accepting the mold mass (and chip) of the transponder chip module 601.

The slit (S1) 604 in the front card body (FCB) 602 is not straight. Rather, the slit 604 follows a sinuous (non-linear, curvy, wavy) path from the module opening to the peripheral (left outer) edge of the metal layer, front card body (FCB) 602.

The slit (S2) 607 in the rear card body (RCB) 606 is also not straight.

In this example, the slits (S1, S2) both have shapes which are non-linear. The slit S1 is located in a different position, orientation or shape than the second slit S2 so that the slits of the layers are not aligned with one another.

Regarding the slit (S2) 607, in both FIGS. 6A and 6C, the rear card body (RCB) 606 does not have a module opening. The slit (S2) 607 wraps around an area under the module opening (MO) 603 in the front card body (FCB) 602, then continues in a sinuous (non-linear, curvy, wavy) path from the area to the peripheral (left outer) edge of the metal layer, front card body (FCB) 602. The slit (S2) 607 may have varying width along its length and may include extensions or spines (not shown) which may serve as a decorative feature.

In order to assist milling of the pocket, particularly in the case where the size of the rear card body (RCB) 606 occupies a significant portion (e.g. >25%) of the area of the card, an easily machined metal or metal alloy may be chosen for some or all of the card construction. This could include various alloys of stainless steel or aluminium alloys such as duralumin.

An additional benefit to using a metal alloy relates to the reading and writing of data to the high coercivity magnetic stripe (MS) 608. Placing the magnetic stripe on top of a non-magnetic metal or metal alloy (e.g. 300 series stainless steel, aluminium, aluminium alloys, titanium) results in reduced data corruption and problems reading data using conventional magnetic stripe readers.

It may be noted that while the inventions disclosed above are illustrated in the form of single cards, showing a single front card body (FCB) with corresponding rear card body (RCB), it is conceived that the cards of various designs may be assembled in a multi-card array prior to cutting and isolating each card. In this manner the front card bodies (FCBs) may consist of a panel with a series of recesses on one side designed to accept panels that will form the rear card body (RCB) of each final card. The assembly process may include any of the following but not limited to: buffing, cleaning, lamination, printing, lacquering, laser engraving, surface coating, sandblasting and insertion of filler materials into voids and slits (S). The final cards may be formed by etching or milling from the assembled multi-card array thereby increasing manufacturing efficiency.

While the invention(s) has/have been described with respect to a limited number of embodiments, these should not be construed as limitations on the scope of the invention(s), but rather as examples of some of the embodiments. Those skilled in the art may envision other possible variations, modifications, and implementations that are also within the scope of the invention(s), and claims, based on the disclosure(s) set forth herein.

What is claimed is:

1. A radio-frequency identification (RFID) smartcard configured to communicate without contact with a terminal, the RFID smartcard comprising:
    a transponder chip module including a chip and a module antenna, wherein the transponder chip module is configured to communicate with the terminal; and
    a coupling frame including a slit, wherein the coupling frame does not have an opening to receive the transponder chip module, and wherein the coupling frame is configured to enhance communications between the transponder chip module and the terminal,
    wherein a portion of the module antenna overlaps a portion of the slit, and
    wherein the transponder chip module further includes a plurality of contact pads electrically coupled to the chip, wherein the contact pads are configured to interface with a contact reader.

2. The RFID smartcard of claim 1, wherein a portion of the chip overlaps a portion of the slit.

3. The RFID smartcard of claim 1, further comprising a module tape, wherein the contact pads are positioned above the module tape, and wherein the chip and module antenna are positioned below the module tape.

4. The RFID smartcard of claim 1, wherein the slit is straight.

5. The RFID smartcard of claim 1, wherein the slit is not straight.

6. The RFID smartcard of claim 5, wherein the slit comprises an open loop.

7. The RFID smartcard of claim 6, wherein the module antenna overlaps the open loop.

8. The RFID smartcard of claim 1, wherein the coupling frame comprises a rear card body.

9. The RFID smartcard of claim 8, wherein the coupling frame includes a recess configured to receive a magnetic strip.

10. A radio-frequency identification (RFID) smartcard configured to communicate without contact with a terminal, the RFID smartcard comprising:
    a transponder chip module including a chip and a module antenna, wherein the transponder chip module is configured to communicate with the terminal;
    a first coupling frame including a slit and a module opening that receives transponder chip module; and
    a second coupling frame including a slit, wherein the second coupling frame does not have an opening to receive the transponder chip module, and wherein the second coupling frame is configured to enhance communications between the transponder chip module and the terminal,
    wherein a portion of the module antenna overlaps a portion of the slit of the first coupling frame, and wherein a portion of the module antenna overlaps a portion of the slit of the second coupling frame, and
    wherein the transponder chip module further includes a plurality of contact pads electrically coupled to the chip, wherein the contact pads are configured to interface with a contact reader.

11. The RFID smartcard of claim 10, wherein a portion of the chip overlaps a portion of the slit of the second coupling frame.

12. The RFID smartcard of claim 10, further comprising a module tape, wherein the contact pads are positioned above the module tape, and wherein the chip and module antenna are positioned below the module tape.

13. The RFID smartcard of claim 10, wherein the slit of the second coupling frame is straight.

14. The RFID smartcard of claim 10, wherein the slit of the second coupling frame is not straight.

15. The RFID smartcard of claim 14, wherein the slit of the second coupling frame comprises an open loop, and wherein the module antenna overlaps the open loop.

16. The RFID smartcard of claim 10, wherein the coupling frame includes a recess configured to receive a magnetic strip.

17. A radio-frequency identification (RFID) smartcard configured to communicate without contact with a terminal, the RFID smartcard comprising:
    a transponder chip module including a chip and a module antenna, wherein the transponder chip module is configured to communicate with the terminal; and
    a coupling frame including a slit, wherein the coupling frame does not have an opening to receive the transponder chip module, wherein the coupling frame is configured to enhance communications between the transponder chip module and the terminal, and wherein the coupling frame includes a recess configured to receive a magnetic strip, and
    wherein a portion of the module antenna overlaps a portion of the slit.

18. The RFID smartcard of claim 17, wherein a portion of the chip overlaps a portion of the slit.

19. The RFID smartcard of claim 17, wherein the slit comprises an open loop, and the module antenna overlaps the open loop.

* * * * *